United States Patent Office 3,146,088
Patented Aug. 25, 1964

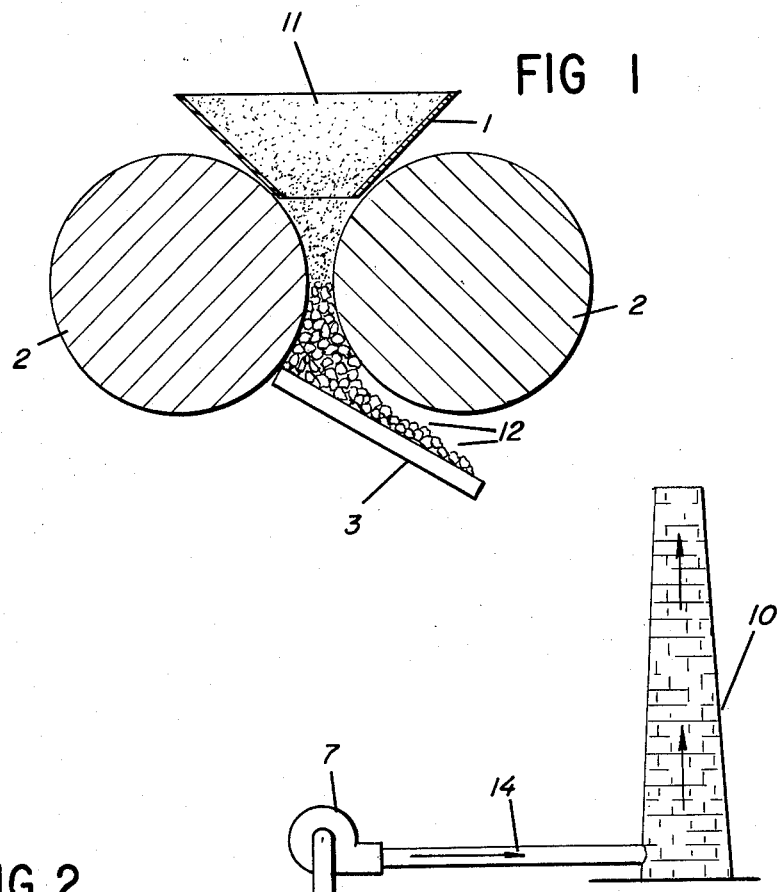
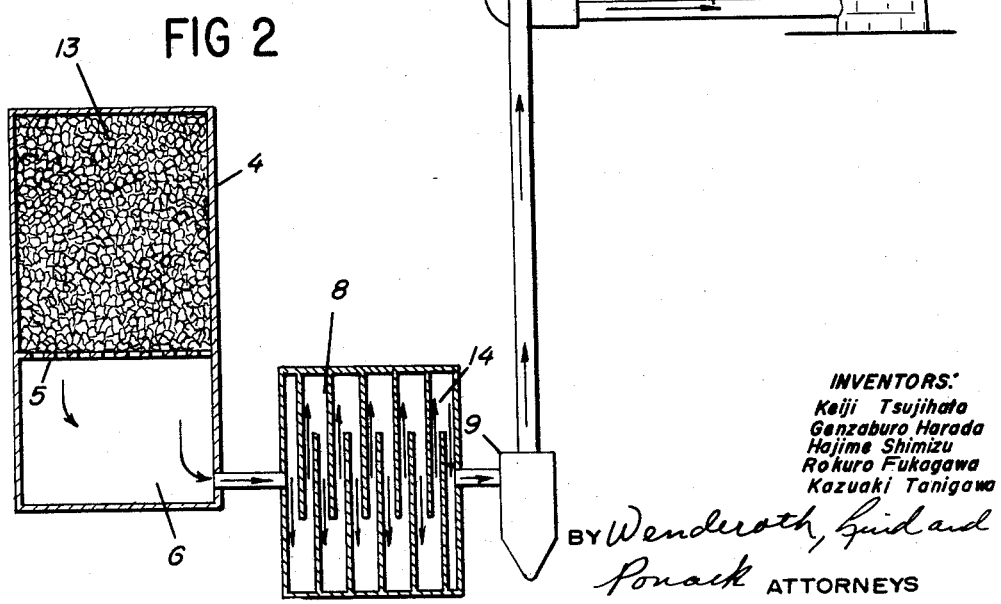

3,146,088
METHOD OF BAKING ORE BRIQUETTES
Keiji Tsujihata and Genzaburo Harada, Yawata, Fukuoka Prefecture, Hajime Shimizu, Tobata, Fukuoka Prefecture, Rokuro Fukagawa, Ashiyamachi, Onga-gun, Fukuoka Prefecture, and Kazuaki Tanigawa, Yawata, Fukuoka Prefecture, Japan, assignors to Yawata Iron & Steel Co., Tokyo, Japan, a corporation of Japan
Filed Aug. 30, 1961, Ser. No. 135,415
Claims priority, application, Japan, Aug. 31, 1960, 35/36,628
3 Claims. (Cl. 75—5)

This invention relates to a method for treating iron-containing sludges. More particularly it relates to a method of obtaining high quality lump iron ores by mixing a blast furnace dust and an open hearth furnace flue dust.

The blast furnace dust produced in the operation of a blast furnace today contains 30 to 40% iron, 20 to 30% carbon, 1 to 2% lead and 1 to 5% zinc. The open hearth furnace flue dust produced in the operation of an open hearth furnace contains 55 to 65% iron, 1 to 5% lead and 5 to 10% zinc. Therefore, as they are, the former is too low in iron content and the latter is too high in lead and zinc content to be adapted to use as raw materials for making iron. Thus, the blast furnace dry recovered dust is magnetically dressed and the dressed iron is reused as briquettes or as sinter by being mixed in a raw material to be sintered as it is. However, as the lead and zinc which are contained in the dust are present in both magnetic and nonmagnetic particles of the dust, it is difficult to separate out the lead and zinc by magnetic dressing.

Further, even in the case where such dust is sintered, since the sintering process is carried out in an oxidizing atmosphere, they will be difficultly separated and will remain in the treated ores.

The open hearth furnace flue dust is a fine powder and contains so much water, lead and zinc that it is not used at all but is discarded today.

The present invention is to solve the problems involving the use of these materials so that the blast furnace dust and open hearth furnace flue dust may be effectively utilized.

A principal object of the present invention is to provide a method of obtaining high quality lump iron ores wherein briquettes are made by mixing a blast furnace dust and an open hearth flue dust together so that the composition may be adjusted which briquettes are subsequently fired.

A further object of the present invention is to provide a method of effectively recovering lead and zinc contained in dusts wherein briquettes are made by mixing a blast furnace dust and an open hearth furnace flue dust together and roasted.

The other objects of the present invention will be made clear by the following explanation and the accompanying drawings.

FIGURE 1 is a diagrammatic sectional view of a briquette molding machine which is an embodiment of the present invention.

FIGURE 2 is a diagrammatic sectional view of a briquette firing operation system which is an embodiment of the present invention.

The substance of the present invention shall be detailed in the following.

According to the present invention, as described above, briquettes are made by mixing a blast furnace dust and open hearth furnace flue dust, firing the said briquettes so that lead and zinc contained in the dusts may be separated, and obtaining recovered and lump iron ores.

First of all, in the present invention, a blast furnace dust and an open hearth furnace flue dust are mixed together so that the content of carbon may be adjusted to be 5 and 15%. According to the present invention, as described later, briquettes are molded to be about 10 to 50 mm. in diameter. However, at a diameter of about 10 to 50 mm., with less than 5% C, the reducing ability will be low and, with more than 15% C, the raw briquettes will be likely to melt.

The blast furnace dust contains 20 to 30% C as described above. Therefore, the solubility of the dust is adjusted by adjusting the content of carbon.

The mixed dusts whose carbon content has been adjusted as described above shall be explained as an example. Raw briquettes are molded to be of a diameter of about 10 to 50 mm. by means of double-wheel type press rollers. It is preferable that such raw briquettes should be of a porosity of more than 20%. It is possible to mold a mixed raw material containing about 20% water by means of the double-wheel type press rollers in the above explanation.

The above mentioned briquettes are then fired at 1,000 to 1,250° C. The firing will naturally progress due to the carbon content. The lead and zinc will be gasified and separated by the reducing atmosphere. When the porosity is made more than 20%, the aeration will become so high that, even if the briquettes are fired by being directly ignited without being dried and preheated, they will not become a powder and the lead and zinc will be able to be quickly removed. When the baking temperature is below 1,000° C., the zinc may not be properly vaporized and removed. Above 1,250° C., the briquettes will melt and become compact and hard, thereby hindering the reducibility of the briquettes when used as material for a blast furnace.

The Zn and Pb gasified and separated in the above described process are made into powdery oxides by the contact with air and will be easily recovered.

In comparing the present invention with the pellet method for example, it is found that, in the pellet method, unless water is removed to be about 10%, the molding will be impossible and, even in case water is removed to be 10% and the molding and firing are carried out, unless the material is well dried and preheated, it will be substantially powdered.

As described above, the advantageous effects of using the present invention are that, as the dry or wet dusts which have up to now been abandoned, are mixed and fired, the dusts can be reproduced as high quality lump iron ores, such detrimental components as lead and zinc can be removed and the life of the blast furnace itself can be lengthened.

An example of the construction and operation of the present apparatus shall be explained in detail with reference to the drawings. FIGURE 1 shows the operation system of a molding machine wherein 1 is a charging hopper, 2 is a molding roll, 3 is a delivery chute, 11 is a raw material and 12 is a raw briquette. FIGURE 2 is a firing operation system diagram wherein 4 is a firing furnace, 5 is a grate made of iron, 6 is a wind box, 7 is an exhaust fan, 8 is a cooler, 9 is a cyclone, 10 is a chimney, 13 is a charged raw briquette and 14 is an arrow indicating suction. For example, both raw materials of a blast furnace dust and an open hearth furnace flue dust are mixed together so that the carbon content may be adjusted to be 5 to 15%, are put into the charging hopper and are pressed and molded by means of the molding rolls 2 and the moldings are taken out through the chute 3. In such case, the pressing force and the rotating velocity may be selected according to the mixed state of the raw materials so that briquettes of a porosiy of more than 20% may be obtained. The raw briquettes are put into the firing furnace 4, air is sucked downward by means of the exhaust fan 7, the surface of the charge is ignited and the firing temperature is adjusted to 1,000 to 1,250° C. As the firing takes place in a reducing atmosphere, the lead and zinc will be gasified and blown and will be contained in the exhaust gas. Therefore, they will be brought into contact with air after leaving the wind box 6 so as to be made into powdery oxides and will be recovered by the cyclone 9. As carbon, lead and zinc have been removed, the fired briquettes will be lump iron ores of such high quality as about 60% T. Fe.

In the above, the downward suction has been described. However, the present apparatus is not limited to downward suction but, even in the case of upward suction, it can be installed in exactly the same manner and the same advantageous effect can be obtained by igniting them from the grate surface.

*Example*

By mixing 30% blast furnace dust and 70% open hearth furnace flue dust together, raw briquettes of a porosity of 25% having the following composition were made:

| | Percent | | Percent |
|---|---|---|---|
| T. Fe | 48.4 | Zn | 4.08 |
| C | 10.5 | Pb | 3.02 |

By firing them, briquettes of the following composition were obtained:

| | Percent | | Percent |
|---|---|---|---|
| T. Fe | 62.2 | Zn | 0.55 |
| C | 0.5 | Pb | 0.27 |

Therefore, the efficiency of removal of Zn and Pb was 86.5 and 91.5%, respectively.

What we claim is:

1. Process for making iron-containing briquettes from flue dust of blast furnace and open hearth furnace comprising
   (1) admixing said blast furnace dust and said open hearth furnace dust to obtain admixture containing 5 to 15% by weight carbon,
   (2) molding said admixture to form briquettes of porosity greater than 20% and between 10 and 50 mm. in diameter, and
   (3) heating said briquettes at temperature between 1000 and 1250° C. in reducing atmosphere, whereby impurities are vaporized and removed.

2. Process of claim 1 wherein said blast furnace dust and said open hearth furnace dust are admixed in ratio of 30:70 parts by weight.

3. Process of claim 1 wherein said porosity is about 25%.

References Cited in the file of this patent

UNITED STATES PATENTS

| 1,213,180 | Fulton | Jan. 23, 1917 |
| 1,278,166 | Kilbourn | Sept. 19, 1918 |
| 1,661,636 | Simpson | Mar. 6, 1928 |
| 1,678,607 | Singmaster et al. | July 24, 1928 |
| 1,926,044 | Gonser | Sept. 12, 1933 |